(12) United States Patent
Gratzer

(10) Patent No.: US 6,776,275 B2
(45) Date of Patent: Aug. 17, 2004

(54) DRIVE SYSTEM FOR AN ALL-WHEEL DRIVEN MOTOR VEHICLE

(75) Inventor: Franz Gratzer, Stallhofen (AT)

(73) Assignee: Steyr Powertrain AG & Co. KG, Lannach (AT)

( * ) Notice: Subject to any disclaimer, the term of this patent is extended or adjusted under 35 U.S.C. 154(b) by 0 days.

(21) Appl. No.: 10/381,605

(22) PCT Filed: Sep. 27, 2001

(86) PCT No.: PCT/AT01/00307
§ 371 (c)(1),
(2), (4) Date: Mar. 26, 2003

(87) PCT Pub. No.: WO02/26512

PCT Pub. Date: Apr. 4, 2002

(65) Prior Publication Data

US 2003/0173179 A1 Sep. 18, 2003

(30) Foreign Application Priority Data

Sep. 27, 2000 (AT) ..................................... GM 711/2000

(51) Int. Cl.$^7$ ............................................. F16D 25/10
(52) U.S. Cl. ............... 192/103 F; 192/48.8; 192/87.12; 192/3.57; 180/248; 475/223
(58) Field of Search ............................... 192/103 F, 35, 192/48.8, 87.12, 3.57; 180/248, 249, 233; 475/223

(56) References Cited

U.S. PATENT DOCUMENTS

| | | | | |
|---|---|---|---|---|
| 4,676,336 A | * | 6/1987 | Hiramatsu et al. | 180/248 |
| 5,226,502 A | * | 7/1993 | Kameda | 180/247 |
| 5,275,254 A | * | 1/1994 | Shiraishi et al. | 180/248 |
| 6,330,928 B1 | * | 12/2001 | Sekiya et al. | 192/103 F |

* cited by examiner

Primary Examiner—Charles A Marmor
Assistant Examiner—Eric M. Williams
(74) Attorney, Agent, or Firm—Bachman & LaPointe, P.C.

(57) ABSTRACT

Drive system for an all-wheel driven motor vehicle having a first and a second driven axle (3, 9), which drive system has a differential-speed-dependent clutch (6) for driving the second driven axle, and an at least partially lockable differential (8) between the wheels of the second driven axle (9). The differential-speed-dependent clutch (6) comprises a pump (10) which, when a differential speed occurs, produces a pressure which leads to the transmission of a torque to the second driven axle (9). In order to ensure that the differential lock responds in a manner coordinated neatly in terms of time and taking account of the driving state, a connecting line (18) leads from the delivery side (11 or 12) of the pump (10) to an actuating member (27) of the lockable differential (8), with the result that, when a differential speed occurs, the pressure produced by the pump (10; 67) makes it possible to at least partially lock the differential (8) by means of a positive locking clutch (26).

11 Claims, 6 Drawing Sheets

DRIVE SYSTEM FOR AN ALL-WHEEL DRIVEN MOTOR VEHICLE

BACKGROUND OF THE INVENTION

The invention concerns a drive system for an all-wheel driven motor vehicle having a first and a second driven axle, which drive system produces the driving connection to the wheels of the second driven axle and has a differential-speed-dependent clutch for driving the second driven axle, and an at least partially lockable differential between the wheels of the second driven axle, the differential-speed-dependent clutch comprising a pump which, when a differential speed occurs, produces a pressure which leads to the transmission of a torque to the second driven axle.

Drive systems of this type are used in all-wheel driven motor vehicles, in which one axle is driven in a continuous and slip-free manner and the other is driven via a differential-speed-dependent clutch. An (in particular lockable) inter-axle differential is thus rendered superfluous because the connection between the axles is not rigid. When the wheels of the continuously driven axle are spinning, the differential-speed-dependent clutch is used to transmit a larger torque to the second driven axle and, in an extreme case, the connection between the two axles is rigid. The second axle needs, for its part, a device for at least partially synchronizing its wheels, whether by selective braking or whether by a lockable axle differential. This is intended to prevent a wheel from spinning.

Known drive systems of this type have, as a differential-speed-dependent clutch, fluid friction clutches (viscous clutches), which may be controllable, or clutches having positive displacement pumps, as described, for example, in EP 629 790 B or in AT GM 3832. In the case of clutches having a pump, the fluid which is pressurized by the pump or the pumps can either directly transmit a torque or can act upon a friction clutch which then transmits a torque, which is dependent on the pressure which is present, to the second driven axle.

As devices for the total or partial locking of the differential between the wheels of the second axle, positive and friction systems are known which, for actuation purposes, require their own power source, whether it be mechanical, hydraulic, electromechanical or else simply their own pump. In the case of positive systems, an engagement order given by the driver, at the correct moment, is often also necessary.

A high structural outlay and considerable amount of space are therefore typical of all of these solutions. Their control of the differential lock is difficult, since the control also has to take account of the operating state of the differential-speed-dependent clutch. It thus has to be ensured, for example, that the axle differential is not locked if the differential-speed-dependent clutch is not yet in engagement.

As an alternative, WO-A 96/41090 (variant of FIG. 14) discloses driving the two wheels of the second axle individually, each via their own differential-speed-dependent clutch. In this case, a dedicated Gerotor pump is used for each side, referred to as a "twin arrangement". However, because of the much higher torque at the axle speed (than at the higher cardan shaft speed), said pump requires a very wide housing between the wheels of the second axle, this signifying a poor use of space and unfavorably short wheel shafts. Above all, however, the coordination and symmetrical distribution of torques to the two wheels and the interaction with electronically controlled brake systems (for example ABS) are not ensured. The distribution of torques also suffers due to the fact that during cornering the outer wheel on the curve runs in overrunning mode, i.e. does not contribute to the traction.

It is an object of the invention to propose a drive system which, with the smallest possible technical outlay, ensures that the differential lock responds in a manner coordinated neatly in terms of time and taking account of the driving state.

SUMMARY OF THE INVENTION

The foregoing object achieved according to the invention by a connecting line leading from the delivery side of the pump to an actuating member of the lockable differential, with the result that, when a differential speed occurs, the pressure produced by the pump makes it possible to at least partially lock the differential.

The differential-speed-dependent clutch therefore transmits the entire amount of torque intended for the second axle at a relatively high speed, and thus only needs a little amount of space. The actuation of the lock by the pressurized fluid from the pump of the differential-speed-dependent clutch saves having its own power source, permits the two locks to be readily coordinated in terms of time and can be adapted to the requirements of an electronically controlled brake system. It also ensures that the axle lock does not act before the differential-speed-dependent clutch is in engagement. With suitable dimensioning of the connecting line and adjustment of the actuating member, the differential can thus be locked at the correct moment or to the correct extent without a special control.

In a preferred embodiment, in which the entire differential-speed-dependent clutch automatically rotates together with the pump and is accommodated in a stationary housing, the operative connection to the actuating member of the lockable differential is produced via a rotary leadthrough between the rotating and stationary housings and via a connecting line to the actuating member. The fluid pressure is thereby transmitted into the housing and can be directed to the differential in a line fixed on the housing or even in the housing itself. When a controllable, differential-speed-dependent clutch is used, a rotary leadthrough is, as a rule, present in any case, with the result that additional outlay is not incurred.

In one possible embodiment, the pump or, for example if a fore-pump is present, at least one pump is arranged in the stationary housing from which the connecting line leads to the actuating member. The rotary leadthrough can therefore be omitted.

In one embodiment of the invention, the differential has a positive lock, the actuating member is fixed on the housing and acts on the lock via a mechanical power train (claim 4). In another embodiment of the invention, the differential has a positive lock, the actuating member of which is a concomitantly rotating fluid piston, and the operative connection to the pump is produced via a further rotary leadthrough. The first solution is particularly simple if a total lock of the axle differential satisfies the requirements and the second one is the better solution for sensitive adjustment of the locking torque.

In a development of the invention, a control valve for controlling the lockable differential is provided in the connecting line. This permits coordination in terms of time of the sequence of the locking of the differential-speeddependent clutch of the axial lock and the locking torques; but only the former in the case of a positive locking clutch. In the simplest case, the control valve is a throttle valve, however, it could also be a temperature-compensating valve, a pressure-limiting valve or a delay valve. To meet exacting requirements, it is a valve which is activated as a function of variables specific to the driving state.

To meet extremely exacting requirements in terms of driving dynamics, the differential-speed-dependent clutch can be controlled. For this purpose, the delivery side of the pump is connected via a pressure channel to a pressure space which is bounded by a piston acting on a friction clutch, and it being possible for the pressure acting on the piston to be controlled by means of a clutch valve which produces the connection between the delivery side of the pump and a low-pressure space by a discharge channel. In a particularly advantageous design of the invention, the connecting line branches off upstream of the clutch valve. As a result, the control of the differential-speed-dependent clutch also acts in the correct direction on the control of the differential lock. If the former control only responds weakly, the locking of the positive clutch also takes place with a more pronounced delay or the locking of the non-positive clutch also takes place only partially.

In a simpler design variant having a more simply constructed differential-speed-dependent clutch, in which the clutch valve is arranged in a discharge channel branching off from the pressure channel, the connecting line branches off upstream of the clutch valve. In this case, a single rotary leadthrough is sufficient for both valves without damage being done to the coordination of the two clutches.

In a developed design variant, in which the pump has a pressure space and an intake space and two discharge channels, one of which is connected, depending in each case on the direction of the difference in speed, to the intake space of the pump and one is connected to the pressure space, in which case the discharge channels are connected via a double clutch valve to the low-pressure space, the connecting line forms two branches, each of which is connected to one of the two discharge channels upstream of the clutch valve. The respectively other discharge channel then serves as an intake channel for the pump. A differential-speed-dependent clutch designed in such a manner is ABS-compatible. The two branches mean that the actuation of the differential lock is independent of the direction of the differential speed and is likewise ABS-compatible.

This developed design variant can be provided with a positive or with a non-positive differential lock. In the former case, a nonreturn valve is provided in each of the two branches and the control valve is a three-position valve (3/3-way directional control valve), a) in the first position of which the connection between the pressure space of the pump and the actuating member is open,
b) in the second position of which the actuating member is connected to the low-pressure space, and
c) in the third position of which the actuating member is connected neither to the low-pressure space nor to the pressure space of the pump. In the position a) a lock is closed, in the position b) the lock is open, and in the position c) the lock is kept closed.

In the case of a non-positive locking clutch as differential lock, a control valve is provided in each of the two branches and is designed as a pulse-width-modulated control valve. The two control valves can be assigned to the direction of the differential speed and permit a particularly sensitive control of the differential lock.

BRIEF DESCRIPTION OF THE DRAWINGS

The invention will be described and explained below with reference to drawings of various embodiments, in which.

DETAILED DESCRIPTION

Figure 1:
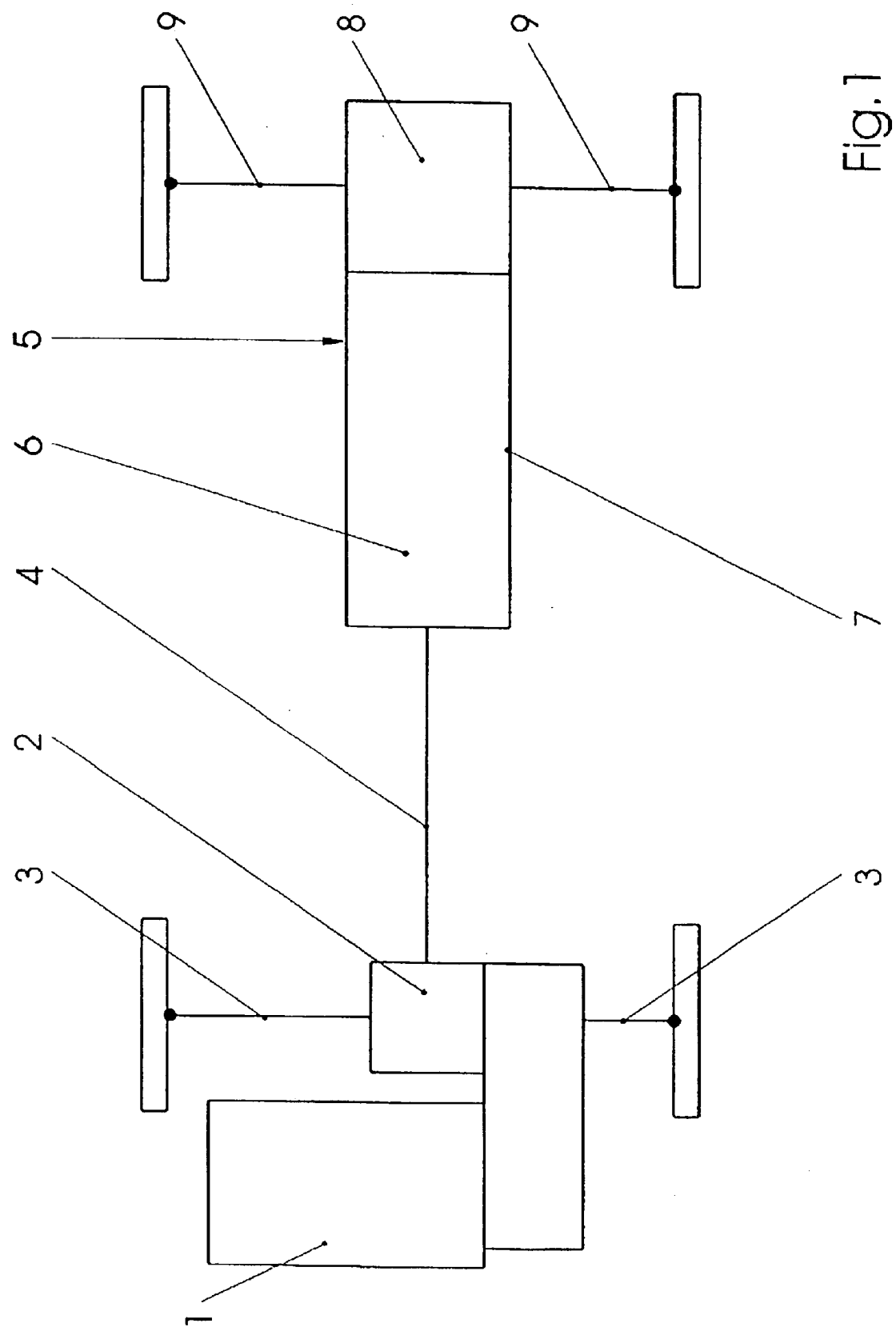
FIG. 1 shows, schematically, the entire drive system.

In FIG. 1, the engine/transmission block is referred to by 1 and the adjoining drive block by 2. The latter is used to drive the half shafts of a first driven axle 3 and, via a V-drive (not illustrated), a propeller shaft 4 leading to the second driven axle 9. The propeller shaft 4 is adjoined by the drive system 5 according to the invention. It comprises a speed-difference-dependent clutch 6, here in a stationary housing 7, and a lockable differential 8 for the second driven axle 9 which can be accommodated in a housing flange-mounted on the housing 7 or integral therewith.

Figure 2:
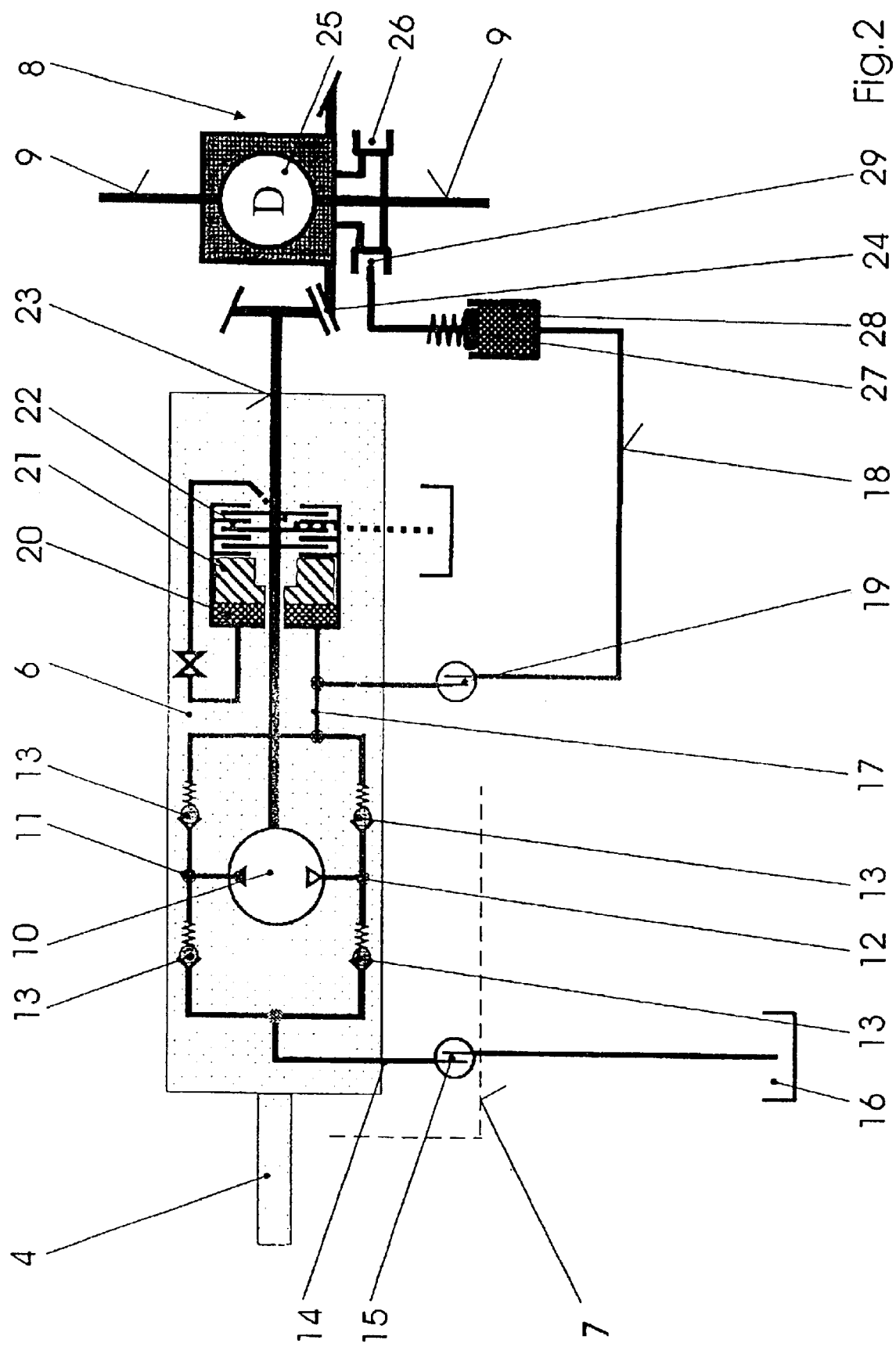
FIG. 2 shows a first, more simple variant having a positive lock.

In FIG. 2, the speed-difference-dependent clutch 6, which is driven by the propeller shaft 4 and rotates as a whole, is indicated as a rectangle with a thin line and its housing 7 is indicated only by a dashed line. The pump supplying the pressure for actuating the speed-difference-dependent clutch is referred to by 10, the delivery side of the pump by 11, the intake side of the pump by 12 and four nonreturn valves situated on both sides by 13. The pump is, for example and preferably, a volumetric pump of the type described in EP 629 790 B. It has two rotors, one of which is connected to the drive side and the other to the output side. When a differential speed occurs, the relative movement of the two rotors causes fluid to be conveyed and a pressure to build up on the delivery side 11.

Since the conveying direction of pumps of this type depends on the direction of the difference in speed, in reverse the delivery side 11 is the intake side and vice versa. However, the nonreturn valves 13 ensure that the respective intake side is always connected to an intake channel 14 and the respective delivery side is always connected to a pressure channel 17. The intake channel 14 merges via a rotary connection 15 into the non-rotating housing 7 and leads into a low-pressure space 16 which is indicated here outside the housing 7 but in reality is situated therein.

A connecting line 18 branches off from the pressure channel 17 and also merges again via a rotary connection 19 into the non-rotating housing. Above all, however, the pressure channel 17 leads into a likewise rotating pressure space 20, in which a piston 21 can be displaced under the effect of this pressure and thus acts upon a friction clutch 22, in this case a multi-plate clutch. The multi-plate clutch 22 constitutes the driving connection between the rotating housing 7 and an output shaft 23 which drives a differential 25 of the second driven axle 9 in a customary manner via bevel gears 24. This differential is a bevel gear differential and has a locking clutch 26, here are positive clutch which is engaged and disengaged by an actuating member 27. This actuating member 27 comprises a piston/cylinder unit 28 with a restoring spring and a toggle fork 29.

Figure 3:
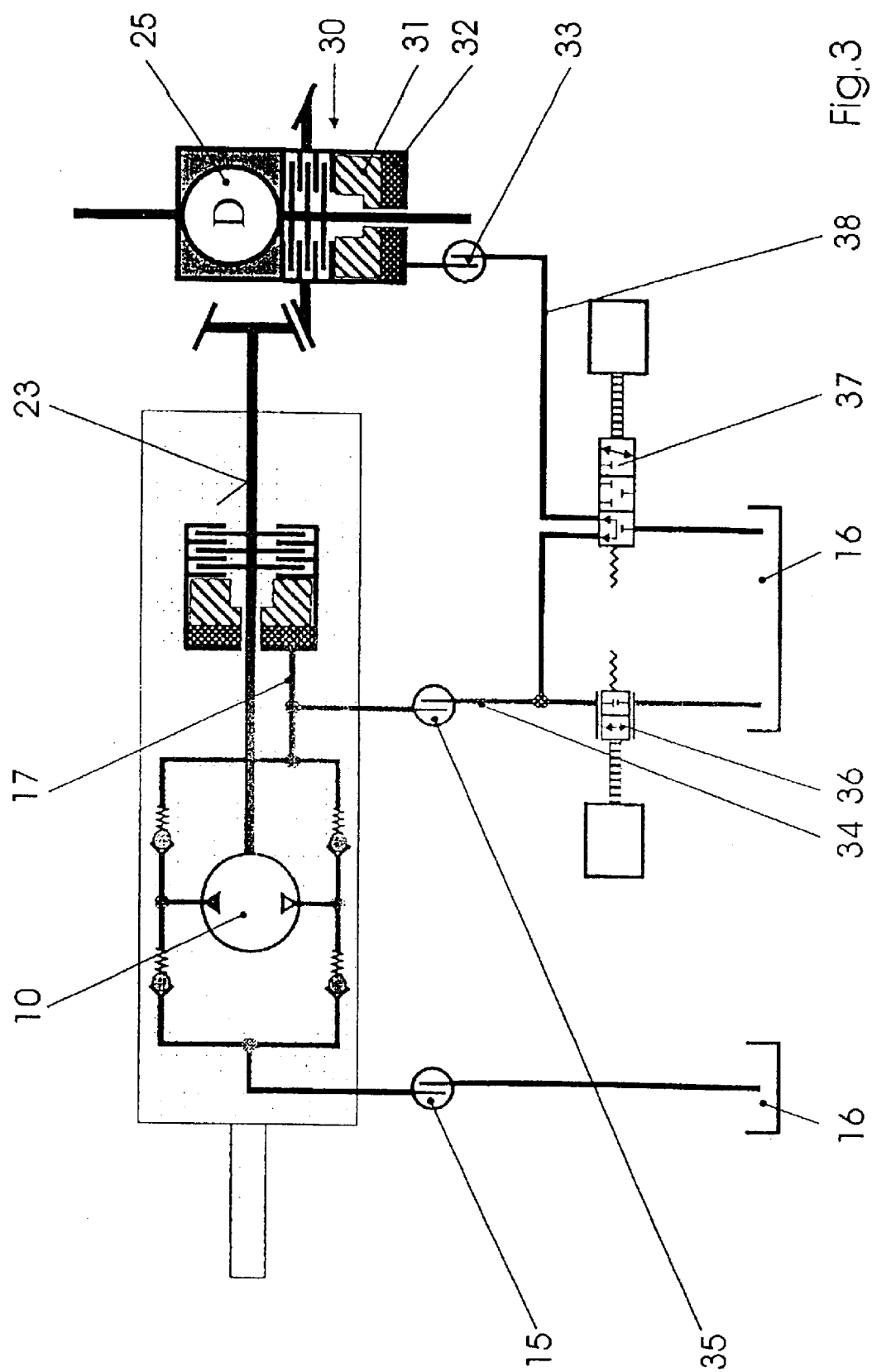
FIG. 3 shows a second, more simple variant having a non-positive lock.

The variant of FIG. 3 differs from that of FIG. 2 by the fact that a non-positive clutch 30, hence a friction clutch and, in particular, a multi-plate clutch, is used as the locking clutch for the differential 25. Said clutch is actuated by a locking piston 31 which, as customary in the case of differentials of this type, rotates together with the locking clutch 30 and with the housing of the differential 25. The pressure chamber 32 is therefore supplied with pressurized fluid via a rotary input 33. A discharge channel 34 branches off from the pressure channel 17 and is guided via a rotary input 35 to the housing, in or on which a clutch valve 36 is provided, said clutch valve being used to control the characteristics of the speed-difference-dependent clutch 6. It is, for example, an electronically controlled, pulse-width-modulated valve with which the pressure and the pressure channel 17 can be changed. The greater the quantity of fluid discharged through the valve 36, the smaller is the torque transmitted by the speed-difference-dependent clutch 6.

Upstream of the clutch valve 36, a connecting line 38 branches off to the locking clutch 30 in which a control valve 37 for acting upon the piston 31 of the locking clutch 30 is situated. The control valve 37 is a 3/3-way directional control valve here. By virtue of the fact that the connecting line 38 branches off upstream of the clutch valve 36, the pressure present in it is also controlled by the clutch valve 36, as a result of which, if the torque transmitted to the second axle decreases, the locking torque in the locking clutch 30 also decreases, and the actuation of the locking clutch 30 always trails somewhat in terms of time after the actuation of the speed-difference-dependent clutch. This trailing can be increased by means of the control valve 37 and the pressure prevailing in the connecting line 38 can be lowered relative to that in the discharge channel 34. This ensures that the differential lock responds in a manner coordinated neatly in terms of time and taking account of the driving state.

Figure 4:
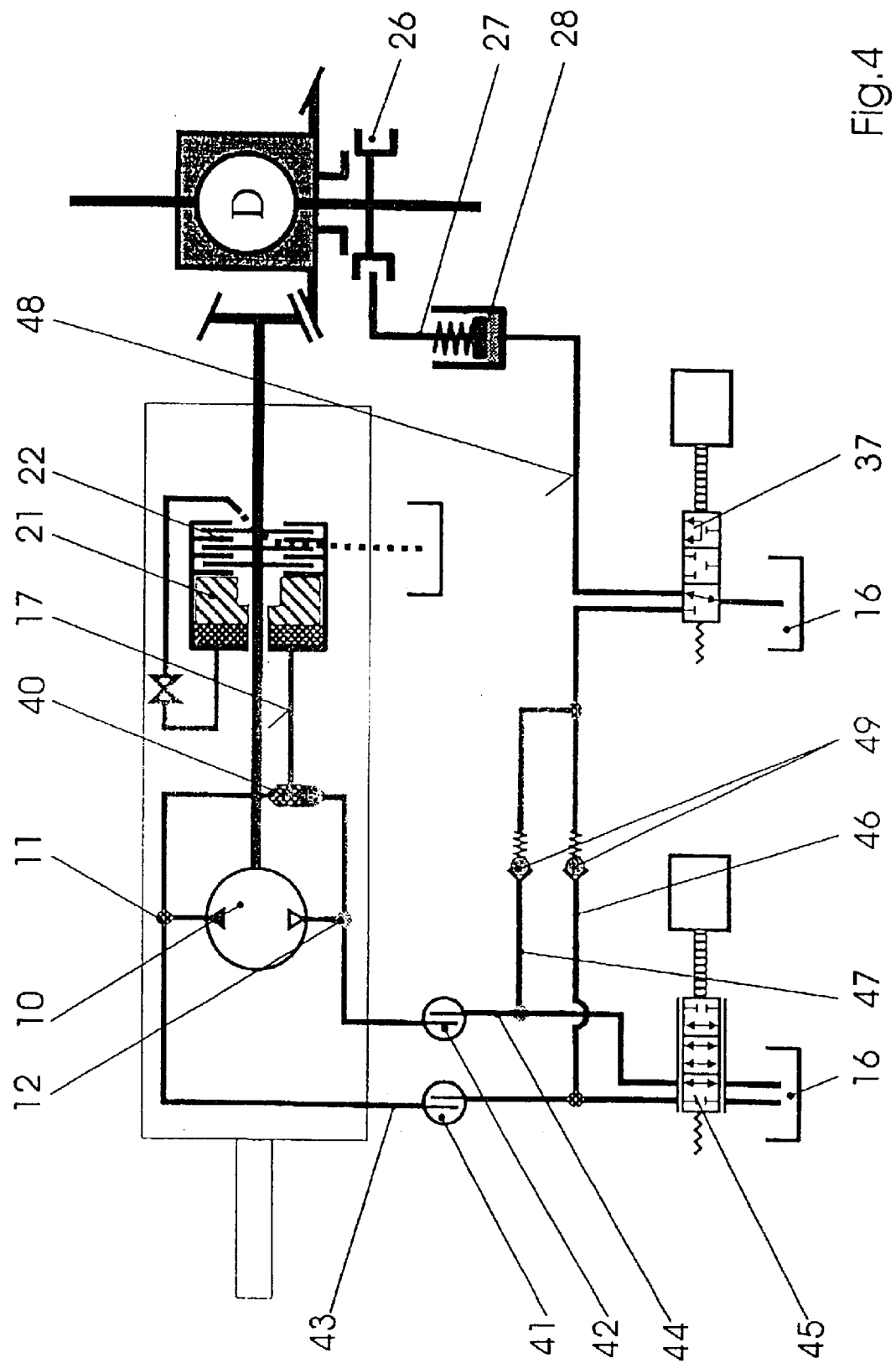
FIG. 4 shows a third variant having a controllable clutch and positive lock.

The variant of FIG. 4 differs from the variants of FIGS. 2 and 3 by the speed-difference-dependent clutch 6 being controlled differently. The delivery side 11 and the intake side 12 of the pump 10 are connected here via a shuttle valve 40 to the pressure channel 17 and via two discharge channels 43, 44 (one of which always serves as the intake channel depending on whether 12 or 11 is the intake side) to the low-pressure space 16. The discharge channels 43, 44 are again guided by rotary leadthroughs 41, 42 to the housing in or on which a clutch valve 45 is situated.

The clutch valve 45 is used to control the pressure prevailing in the pressure channel 17 and therefore the torque transmitted by the speed-difference-dependent clutch 6. Since both discharge channels 43, 44 lead here to the clutch valve 45, the latter is a double valve which can also be designed as a pulse-width-modulated valve. It permits a more precise and more rapid control of the speed-difference-dependent clutch 6, which is advantageous, in particular, for interaction with an ABS.

A connecting line 48 again branches off upstream of the clutch valve 45. However, said connecting line branches here into a first branch 46 and the second branch 47, one of which branches off to the first discharge channel 43 and one to the second discharge channel 44, again upstream of the clutch valve 45. In order for in each case, depending on the direction of the difference in speed prevailing at the pump 10, the channels serving as the discharge channel to lead to the connecting line 48 and the other of the two branches to be locked, two nonreturn valves 49 are provided.

Figure 5:
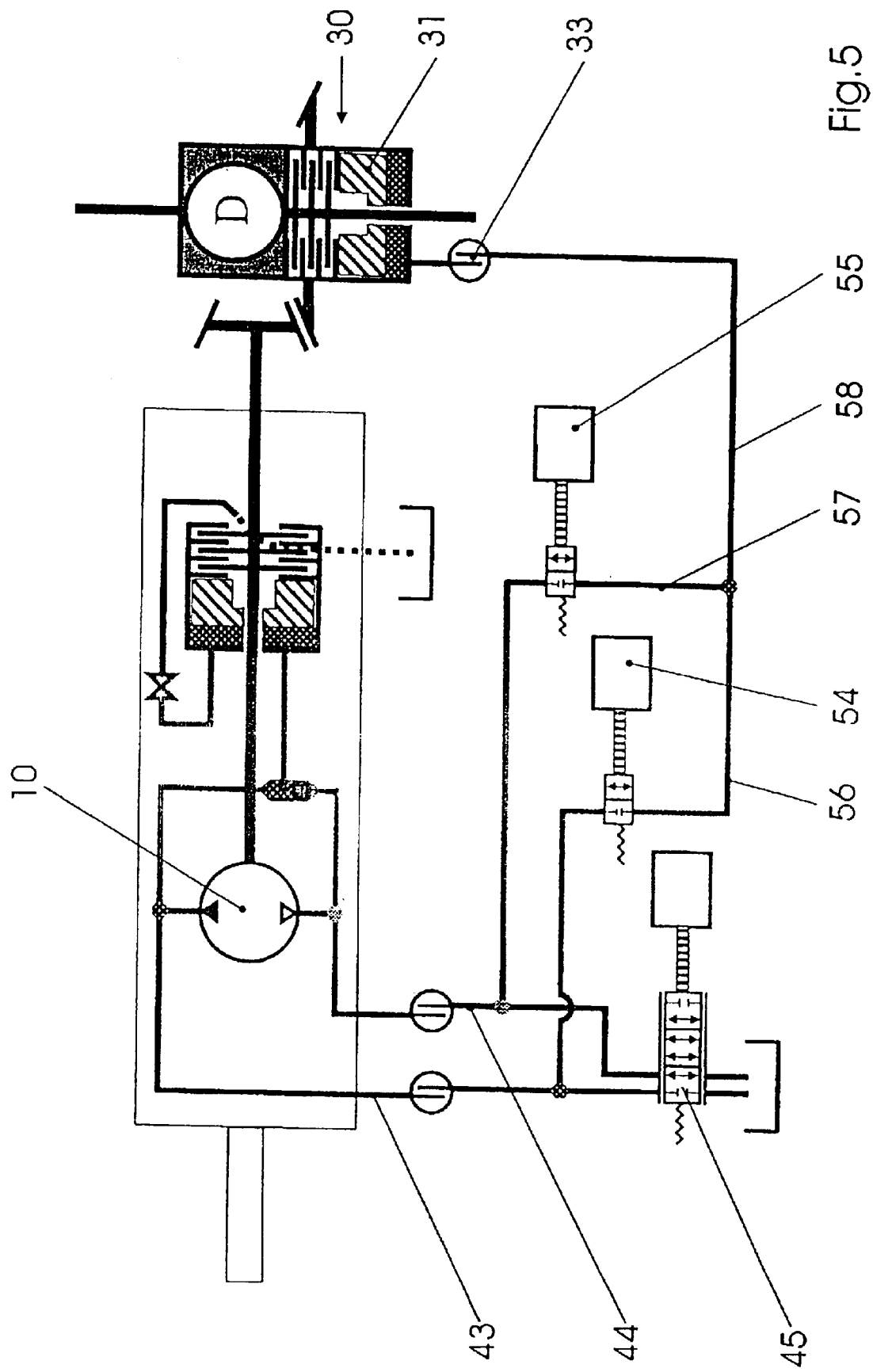
FIG. 5 shows a fourth variant having a controllable clutch and non-positive lock.

The variant of FIG. 5 differs from that of FIG. 4 by the control of the locking clutch 30 being in a different form. Instead of the control valve, 37, in this case two control valves 54, 55 are provided and are designed, for example, as pulse-width-regulated seat valves. The first control valve 54 is arranged in the first branch 56 and the second control valve 55 is arranged in the second branch 57 of the connecting line 58. The two branches 56, 57 again branch off from the discharge channels 43, 44 upstream of the clutch valve 45.

Figure 6:
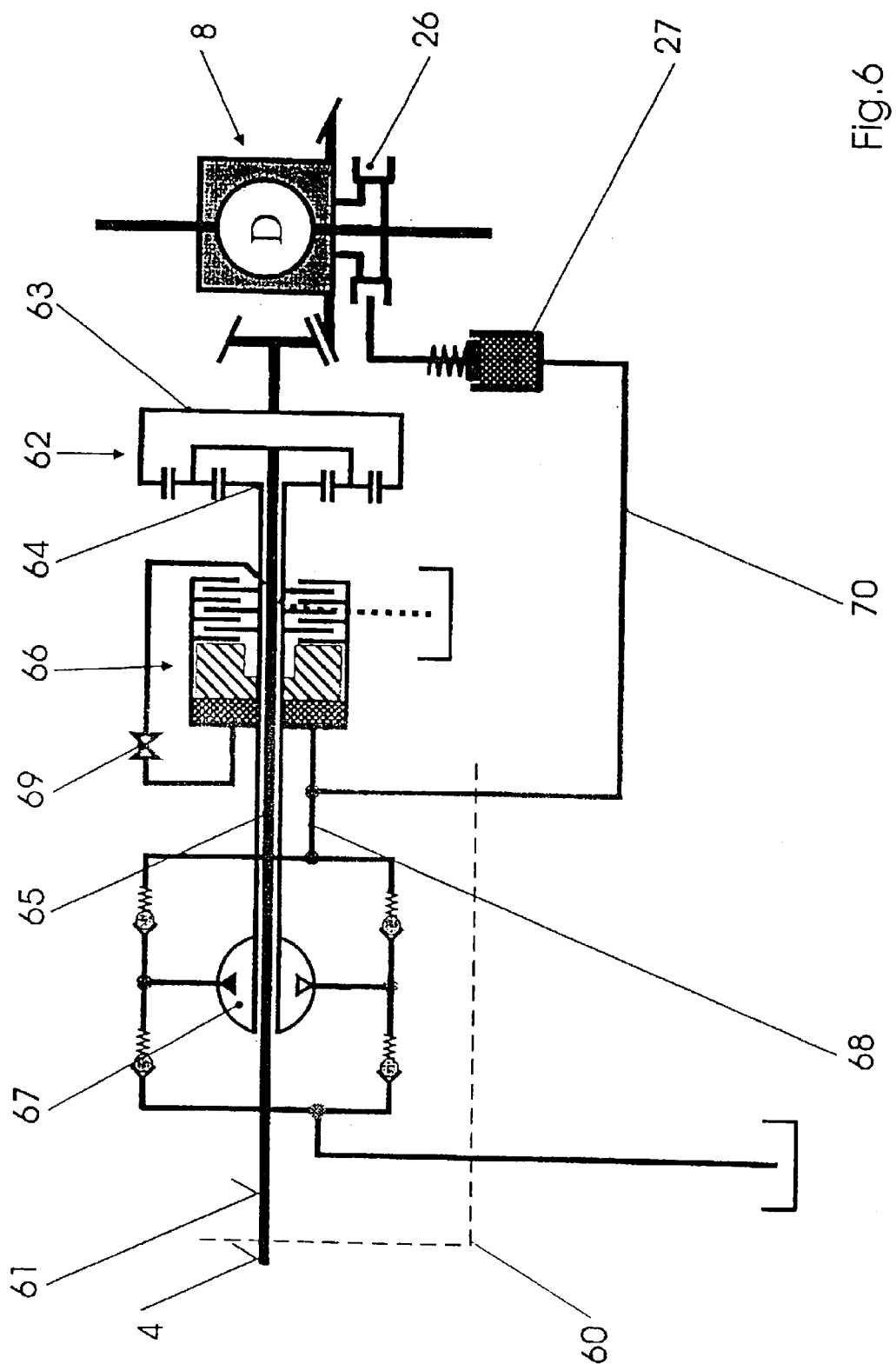
FIG. 6 shows a different embodiment.

FIG. 6 shows an example of the different embodiment having a fixed pump. Rotary leadthroughs (such as, for example, 15, 19 in FIG. 2) are therefore not required for its use. The housing 60 is indicated by a dashed line and does not rotate. The propeller shaft 4 continues in an input shaft 61 which ends at the other end in a planet gear 62. It uses planet wheels, on the one side, to drive the lockable differential 8 via a ring gear 63 and, on the other side, uses a sun wheel 64 to drive a pump shaft 65 which is guided through the speed-difference-dependent clutch 66 and drives the pump 67 (having a fixed housing not shown in detail). The speed-difference-dependent clutch 66 is stationary and acts as a brake for the pump shaft 65. With the two driven axles 3, 9 at the same speed, the planet gear 62 revolves as a block or the sun wheel 64 is at a standstill, given an appropriate selection of the transmission ratios. When a difference in speed occurs, the pump 67 is driven by the sun wheel 64 and supplies pressurized fluid via the pressure channel 68 to the clutch 66 which brakes the sun wheel shaft 65 and intensifies the throughput to the lockable differential 8. A connecting line 70 again branches off from the pressure channel 68 to the actuating member 27 of the locking clutch 26.

Within the scope of the invention, the different elements of the exemplary embodiments described can be combined in various ways. In every case, a symmetrical drive of the two half shafts of the second driven axle and good coordination of the speed-difference-dependent clutch and of the locking clutch with each other in terms of time and torque are achieved with it being possible to further refine the coordination by means of additional control actions.

What is claimed is:

1. A drive system for an all-wheel driven motor vehicle having a first and a second driven axle (3, 9), which drive system produces the driving connection to the wheels of the second driven axle (9) and has a differential-speed-dependent clutch (6) for driving the second driven axle, and an at least partially lockable differential (8) between the wheels of the second driven axle (9), the differential-speed-dependent clutch (6) comprising a pump which, when a differential speed between the first and second driven axles (3, 9) occurs, produces a pressure which leads to the transmission of a torque to the second driven axle (9), wherein a connecting line (18; 38; 48; 58, 70) leads from the delivery side (11 or 12) of the pump (10; 67) to an actuating member (27; 31, 32) of the lockable differential (8), with the result that, when a differential speed occurs, the pressure produced by the pump (10; 67) makes it possible to at least partially lock the differential (8).

2. The drive system as claimed in claim 1, the entire differential-speed-dependent clutch (6) automatically rotating together with the pump (10) and being accommodated in a stationary housing (7), wherein the operative connection to the actuating member (27, 31, 32) of the lockable differential (8) is produced via a rotary leadthrough (19; 35; 41, 42) between the differential-speed-dependent clutch (6) and stationary housing (7) and via a connecting line (18; 38; 48; 58) to the actuating member (27; 31, 32).

3. The drive system as claimed in claim 1, with the entire differential-speed-dependent clutch (6) being accommodated in the stationary housing (60), wherein a pump (67) is arranged in the stationary housing (60) from which a connecting channel (70) leads to the actuating member (27).

4. The drive system as claimed in claim 1, wherein the lockable differential (8) has a positive locking clutch (26), the actuating member (27) is fixed on the housing and acts on the lock via a mechanical power train (29).

5. The drive system as claimed in claim 1, wherein the lockable differential (8) has a non-positive locking clutch (30), the actuating member of which is a concomitantly rotating fluid piston (31), and the operative connection to the pump (10) is produced via a further rotary leadthrough (33).

6. The drive system as claimed in claim 1, wherein a control valve (37; 54, 55) for controlling the lockable differential (8) is provided in the connecting line (38; 48; 58).

7. The drive system as claimed in claim 6, the delivery side (11 or 12) of the pump (10) being connected via a pressure channel (17) to a pressure space which is bounded by a piston (21) acting on a friction clutch (22), and it being possible for the pressure acting on the piston (21) to be controlled by means of a clutch valve (36; 45) which produces the connection between the delivery side of the pump (10) and a low-pressure space (16) by a discharge channel (34; 43 or 44), wherein the connecting line (38; 48; 58) branches off upstream of the clutch valve (36, 45).

8. The drive system as claimed in claim 7, wherein the clutch valve (36) is arranged in a discharge channel (34) which branches off from the pressure channel (17) and from which the connecting line (38) branches off upstream of the clutch valve (36).

9. The drive system as claimed in claim 7, the pump (10) having a pressure space (11, 12) and an intake space (12, 11) and two discharge channels (43, 44), one of which is connected, depending in each case on the direction of the difference in speed, to the intake space (12, 11) of the pump (10), which discharge channel (43, 44) are connected via a clutch valve (45) to the low-pressure space (16), wherein the connecting line (48; 58) forms two branches (46, 47; 56, 57), each of which is connected to one of the two discharge channels (43, 44) upstream of the clutch valve (45).

10. The drive system as claimed in claim 9 having a positive locking clutch (26), wherein a nonreturn valve (49) is provided in each of the two branches (46, 47), and wherein the control valve (37) is a three-position valve, a) in the first position of which the connection between the pressure space (11 or 12) of the pump (10) and the actuating member (27) is open, b) in the second position of which the actuating member (27) is connected to the low-pressure space (16), and c) in the third position of which the actuating member (27) is connected neither to the low-pressure space (16) nor to the pressure space (11 or 12) of the pump (10).

11. The drive system as claimed in claim 9 having a non-positive locking clutch (30), wherein a control valve (54, 55) is provided in each of the two branches (56, 57) and is designed as a pulse-width-modulated control valve.

\* \* \* \* \*